Oct. 11, 1932. G. C. JETT 1,881,630
CRAWLER TREAD MECHANISM
Filed Dec. 15, 1927 3 Sheets-Sheet 1
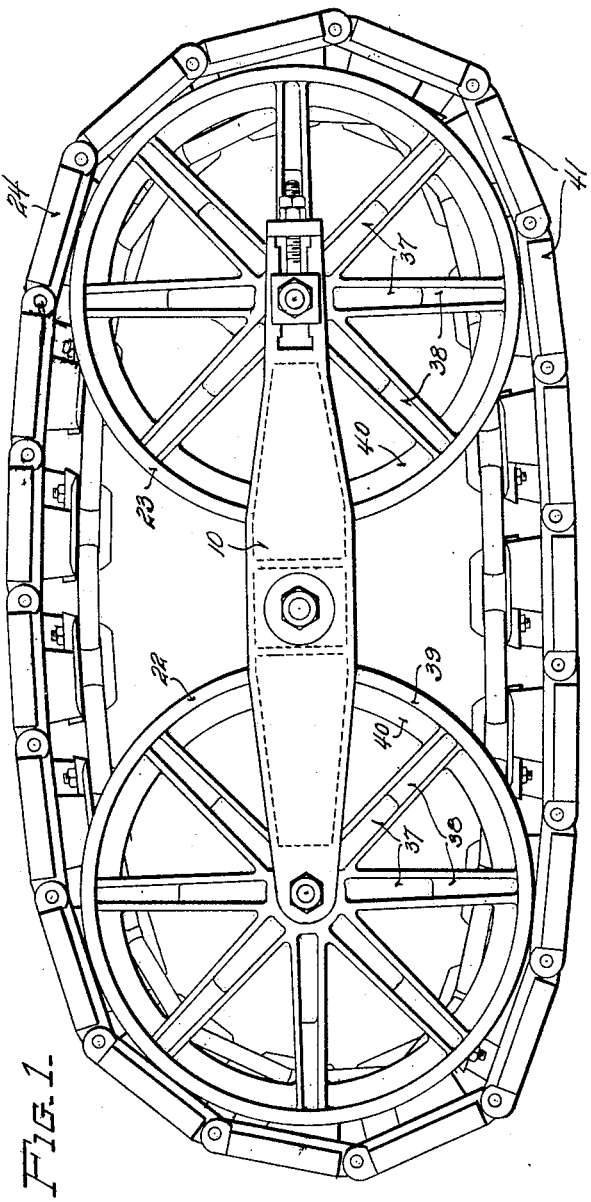
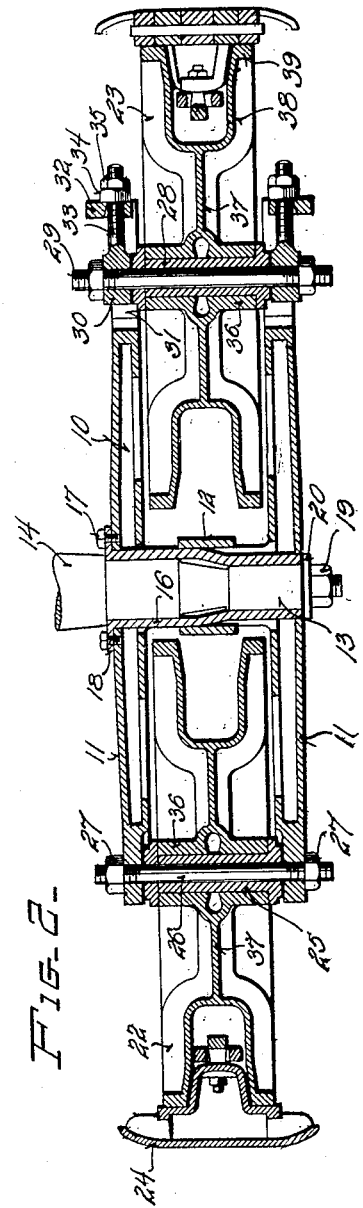
INVENTOR.
GEORGE C. JETT
BY
ATTORNEY.

Oct. 11, 1932.  G. C. JETT  1,881,630
CRAWLER TREAD MECHANISM
Filed Dec. 15, 1927   3 Sheets-Sheet 2
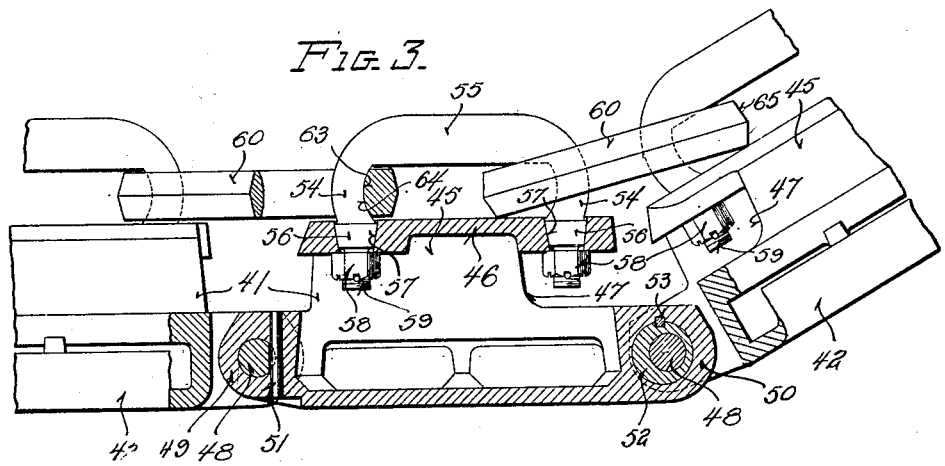
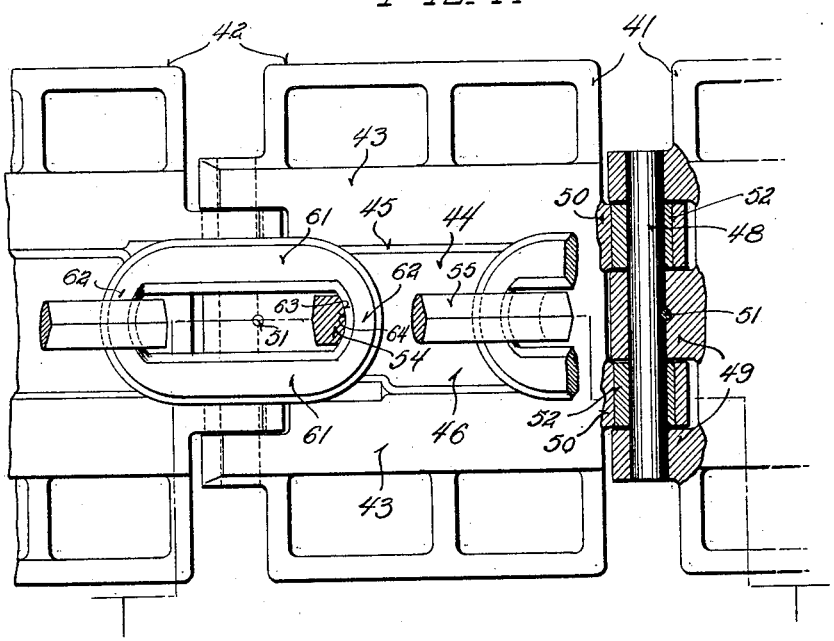
INVENTOR.
GEORGE C. JETT
BY
ATTORNEY.

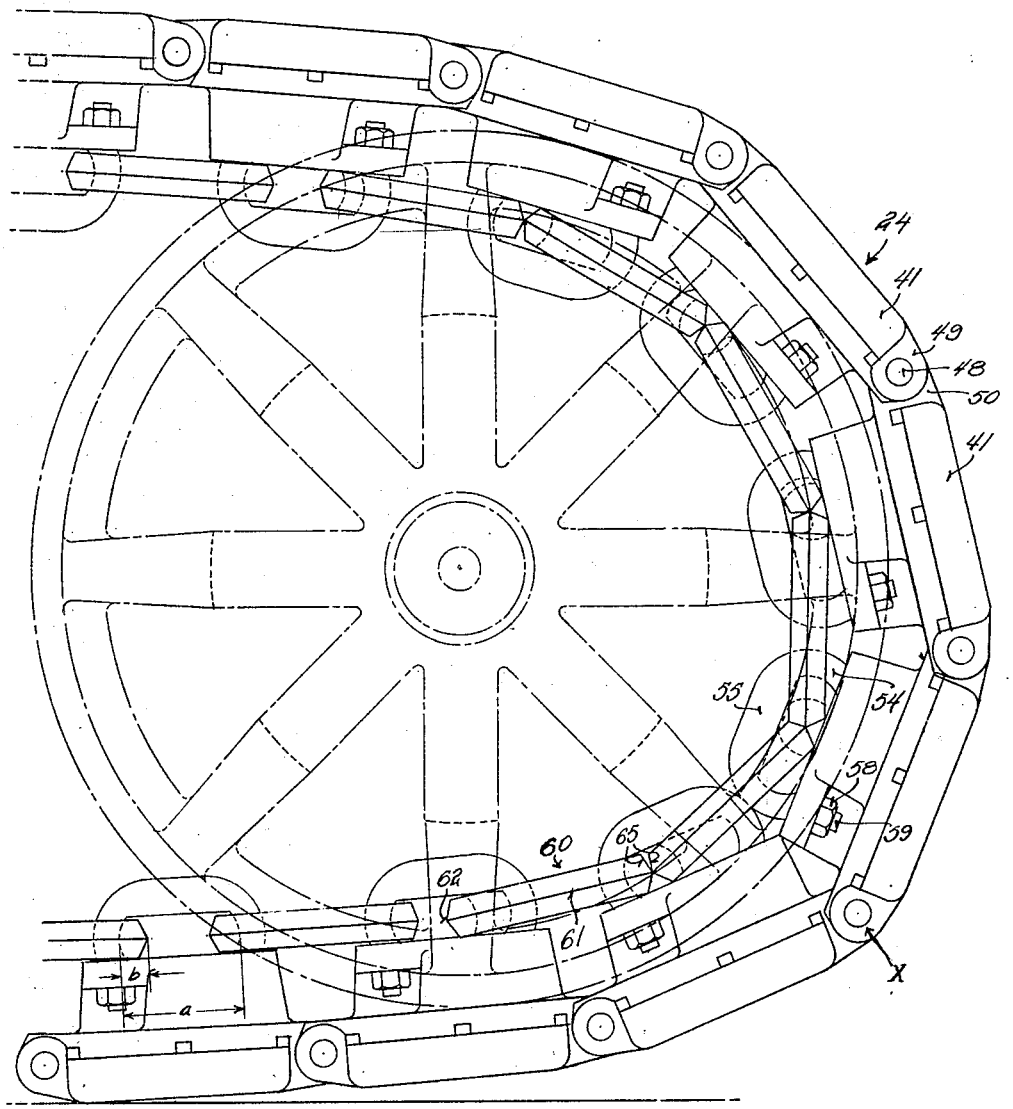

Patented Oct. 11, 1932

1,881,630

UNITED STATES PATENT OFFICE

GEORGE C. JETT, OF MILWAUKEE, WISCONSIN, ASSIGNOR OF TWO-FIFTHS TO WALTER H. STIEMKE, OF MILWAUKEE, WISCONSIN

CRAWLER TREAD MECHANISM

Application filed December 15, 1927. Serial No. 240,141.

This invention relates to crawler tread mechanisms and particularly to endless tread belts of the self-sustaining type capable of providing a substantially rigid track for the end rollers or tumblers without requiring the use of intermediate rollers so commonly employed to sustain the belt against buckling under load.

One object of the present invention is to provide an improved high capacity tread belt of the type mentioned of rugged, simple, and economical design.

Other more specific objects and advantages will appear from the following description of an illustrative embodiment of the present invention.

In the drawings:—

Figure 1 is a view in side elevation of a crawler tread mechanism constructed in accordance with the present invention.

Fig. 2 is a horizontal sectional view.

Fig. 3 is a fragmentary sectional view on a larger scale of the tread belt shown in Figures 1 and 2. This view is taken substantially along the line 3—3 of Figure 4.

Fig. 4 is an inner plan view partly in section, of that portion of the tread belt shown in Figure 3.

Fig. 5 is a view in side elevation of an end loop of the tread belt showing the relative disposition of the parts when the belt is flexed about an end roller or tumbler.

The crawler tread mechanism shown comprises a substantially rigid truck frame 10 preferably in the form of a one-piece H-shaped casting having a pair of laterally spaced, substantially parallel, longitudinal members 11, integrally connected intermediate their ends by a cross member 12. The members 11 and 12 are preferably of hollow box-section design in order to provide maximum strength with minimum weight. The truck frame shown is rockably mounted intermediate its ends upon a spindle 13 projecting horizontally from a supporting bracket 14 of a well known type. In this instance the spindle is journaled in an appropriate bearing sleeve 16 removably seated within the hollow cross member 12 and locked in position by appropriate means such as cap screws 17, which pass through an end flange 18 on the sleeve. A nut 19 threaded upon the end of the spindle coacts with a washer 20 and shoulder 21 to retain the spindle against end play within the sleeve.

A pair of end rollers or tumblers 22 and 23, mounted at the opposite ends of the frame 10, intermediate the longitudinal members 11, constitute a support and guide for the endless tread belt 24 to be hereinafter described. In this instance roller 22 is journaled upon an appropriate bushing 25 carried by a fixed shaft 26 projecting through the adjacent ends of the longitudinal members 11 and securely anchored therein by appropriate means, such as nuts 27 threaded upon the opposite ends of the shaft. The bushing 25 serves as a spacer element for the ends of the members 11 and, coacting with the shaft and clamp nuts 27, provides a rigid tie between those members to thereby increase the strength and rigidity of the frame. The other roller 23 is similarly journaled upon a bushing 28 carried by a shaft 29, which projects through and is similarly anchored in a pair of slide blocks 30 guided in appropriate ways 31 formed in the other ends of the longitudinal members 11. In this instance the outer ends of the ways 31 are closed by tie-bars 32 cast integral with the members 11. Each tie-bar 32 not only holds the ways 31 against spreading but each also co-acts with an adjusting screw 33, projecting from each slide block 30, to effect adjustment of the blocks and shaft 29 longitudinally of the ways. Each screw 33 carries an adjusting nut 34 and lock nut 35.

Each of the end rollers or tumblers 22 and 23 is formed with a relatively deep hub 36, presenting a relatively wide bearing surface to the bushing 25 or 28, and carrying a series of spokes 37 of double-channel section providing maximum strength with minimum weight. The outer portions 38 of the spokes are forked and merge into two parallel rim portions 39, designed to ride upon the tread belt, and spaced apart to form a guide channel for the belt. Each rim is preferably reinforced by a circular web 40 which merges therewith and with the outer ends of the spokes.

The tread belt shown comprises a series of hingedly connected track shoes 41 each in the form of a hollow casting having a laterally extended outer plate 42, presenting a broad tread surface to the ground, and a pair of laterally spaced inner plates 43, providing runways for the rims 39 of the end rollers. A hollow open ended projection 44 on each shoe, intermediate the plates 43 coacts with and between the rims 39 to guide and retain the tread belt on the end rollers. The side walls 45 of each projection 44 extend from the adjacent plates 43 of the shoe and merge into a cover plate 46 constituting the inner extremity of the projection. One end of each side wall 45 is preferably cut away, as indicated at 47 to afford ready access to the interior of each projection, for a purpose which will later appear and to permit the ready extrusion of foreign matter therefrom. Successive shoes are connected by appropriate hinge pins 48 each projected through two series of closely meshed lugs 49 and 50, respectively, projecting from the adjacent edges of successive shoes. In this instance each pin 48 is removably fixed within the series of lugs 49 of one shoe by appropriate means, such as an anchor pin 51, and is journaled in appropriate bushings 52 seated in each of the series of lugs 50 of the other shoe. Each bushing 52 is preferably eccentrically bored, as indicated in Figure 3, so that a rotative change in the position thereof will effect a variation in the shoe pitch. Each bushing, in the tread belt shown, is releasably held against rotation by appropriate means such as a key 53, so that a predetermined adjustment between successive shoes may be had by withdrawing and reinserting the bushing end for end to thereby reverse the direction of eccentricity thereof.

It will be noted that the hinge connection between successive track shoes permit free flexing of the belt in such direction as to permit the same to travel about the end rollers 22 and 23. Provision is made however for positively limiting flexure of the belt in the other direction so that the lower run thereof may resist buckling under the reaction of the tread surface and thus provide a substantially rigid continuous track for the end rollers. Although a tread belt having these general characteristics is not broadly new the tread belt shown involves certain important structural features which are new and which afford numerous structural and functional advantages hereinafter pointed out. In this instance each track shoe 41 carries a pair of posts 54 securely anchored in the plate 46 and preferably connected by a bridge piece 55 to increase the strength and rigidity of the posts. The posts 54 and bridge piece 55 are preferably formed from a single piece of high grade steel of high tensile strength by common forging methods. Each post shown terminates in a tapered head 56 which is tightly drawn into a similarly tapered seat 57 in the plate 46 by the action of a nut 58 on a threaded stem 59 projecting from the head. The posts 54, bridge piece 55, and plate 46 together form a closed link, hereinafter termed an anchor link, which is connected with the corresponding links of adjacent shoes through loose connector links 60 slidably engaged therewith. Each connector link 60 also comprises a high quality steel forging of simple form having substantially parallel side bars 61 connected by end portions 62. Each end portion 62 is closely but freely guided between the bridge piece 55 and plate 46 of the associated anchor link and the side bars 61 straddle the posts 54 and are similarly guided by them so that the connector links are always properly aligned with the anchor links. The inner active faces 63 of the posts are preferably curved longitudinally and peripherally to match the peripheral and longitudinal curvatures of the coacting faces 64 of the end portions 62 of the connector links, as indicated in Figures 3 and 4, so that each makes full face contact with the other to better withstand the wear and sustain the high pressures to which they are subjected.

In the upper and lower runs of the tread belt these faces 63 and 64 react to effectually limit the pivotal action of successive shoes in such direction as to prevent inward buckling of the tread belt. Each run of the belt thus forms a rigid beam construction, spanning the space between the end rollers 22 and 23, in which the anchor and connector links are under tension and the track shoes 41 under compression transmitted through the hinge pins 48. The anchor and connector links are preferably of such length as compared with the spacing between hinge pins 48, that the upper and lower runs of the belt are bowed slightly outwardly. This relation may be varied by adjusting the bushings 52 in the manner hereinabove described to thereby vary the bowed condition of the tread belt and to compensate for wear.

Referring particularly to the lower run of the tread belt it will be noted that for a given load thereon the tension in the anchor and connector links is inversely proportional to the height thereof above the hinge pins 48, or in other words the ability of the belt to resist buckling under load increases as the height of the links increases. On the other hand the greater the height of the links the greater the slack required to permit the tread belt to travel about the end rollers. All of the slack within an end loop of the tread belt is consumed when the successive connector links comprised therein have assumed an end to end abutting relation, as indicated in Figure 5, and from an inspection of this figure it will be noted that the total slack actually provided within the end loop is proportional to the length of the space $a$ within an anchor link minus twice the thickness $b$ of an end portion 62 of a connector link. Therefore a reduction in the thickness $b$ of each end portion 62 provides a greater total slack and thus permits a greater elevation of the links above the hinge pins 48 to thereby actually increase the ability of the tread belt to resist inward buckling under load. The outer faces of each end portion 62 of a connector link are preferably symmetrically bevelled, as indicated at 65, to provide full bearing surfaces for contact with the corresponding faces of adjacent connector links, and to provide a minimum spacing between connector links and consequently a maximum total slack between the links comprised within each end loop of the tread belt. Although the end portions 62 of each connector link are made as slender as possible, consistent with the stresses involved, the side bars 61 are preferably made somewhat heavier in order to prevent excessive stretching and thus preserve the above mentioned outwardly bowed condition at the lower run of the tread belt.

For smooth running the spacing of the end rollers 22 and 23 and the tension in the tread belt is such that maximum angular deflection between successive track shoes occurs at point $x$ adjacent the lower end of each tread belt loop. It will be noted from Figure 5 that at this point the ends of the anchor links of adjacent shoes are in abutting relation and their lengths thus limit the degree of angular deflection between the shoes. The lengths of the anchor links are thus limited by the amount of deflection required at this point and in the tread belt shown it will be noted that the anchor links are somewhat shorter than the connector links. In order that the space $a$ within each anchor link may be made as long as possible the width of the posts 54 is reduced as much as possible, consistent with the stresses involved, and in this instance the posts are of substantially the same width as the end portions 62 of the connector links. For the same reason the posts are preferably outwardly bowed.

By reason of the simple form of anchor and connector links hereinabove described they may be economically produced by simple die forging methods from high grade steel of sufficient strength and toughness to withstand severe stresses and wear. The open form of anchor links with their ends anchored in the track shoes permits of easy assembly and dismantling of the tread belt. In this connection it will be noted that the anchor nuts 58 are readily accessible through the cut-away portions 47 of the hollow projections 44. It will be noted that the width of the connector links 60 is such as to pass freely between the spaced rims 39 of the end rollers 22 and 23 and thus serve as additional guides for the tread belt which insure entry and reentry of the guide projections 44 of the track shoes between the rims 39 of the end rollers. It will also be noted that the limited extent to which the anchor and connector links project from the track shoes permits the use of single rather than double end rollers thus simplifying and reducing the cost of the crawler unit.

Various changes my be made in the embodiment of the present invention without departing from or sacrificing any of the advantages of the invention as defined in the appended claims.

I claim:—

1. In a truss-type tread belt for crawler mechanisms the combination of a series of hingedly connected shoes cooperating to form an endless tread belt, an intermediate projection extending inwardly from each shoe, an anchor link having leg portions removably fixed in said projection of each shoe, and connector links interengaged with the anchor links of successive shoes and coacting therewith to limit the hinge action between said shoes.

2. In a truss-type tread belt for crawler mechanisms the combination of a series of hingedly connected shoes, an intermediate hollow projection extending inwardly from each shoe, an anchor link projecting inwardly from each projection, each link having leg portions seated in said projection, securing means for said leg portions within said projection, openings in said projection providing access to said securing means, and connector links connecting the anchor links of successive shoes.

3. In a truss-type tread belt for crawler mechanisms the combination of a series of shoes, hinge connections between said shoes, an elongated anchor link projecting inwardly from each shoe, and connector links each interengaged with the anchor links of successive shoes and coacting therewith to limit the hinge action between shoes.

4. In a truss-type tread belt for crawler mechanisms the combination of a series of shoes, hinge connections between shoes, an anchor link projecting inwardly from each shoe, connector links each interengaged with the anchor links of successive shoes to limit the hinge action between shoes in one direction, said connector links being arranged to abut each other to thereby limit the hinge action between shoes in the other direction, the abutting faces of said connector links being bevelled to increase the bearing area thereof.

5. In a truss-type tread belt for crawler mechanisms, the combination of a series of shoes, hinge connections between said shoes, an anchor link projecting inwardly from each shoe, and connector links interengaged with the anchor links of successive shoes, said connector links being at least as long as said anchor links and coacting therewith to limit the hinge action between said shoes.

6. In a truss-type tread belt for crawler mechanisms, the combination of a series of shoes, hinge connections between said shoes, an inward projection on each shoe, sockets adjacent the ends of said projection, a U-shaped anchor link, the ends of said anchor link being fixed in said sockets, and connector links interengaged with and between said anchor links to limit the hinge action between said shoes.

7. In a truss-type tread belt for crawler mechanisms, the combination of a series of shoes, hinge connections between said shoes, an inwardly disposed hollow projection on each shoe, openings in said hollow projection, a U-shaped anchor link, the ends of said anchor link being seated in said openings, means within said hollow projection for releasably fixing said ends in said openings, and connector links interengaged with and between the anchor links of successive shoes to limit the hinge action between said shoes.

8. In a truss-type tread belt for crawler mechanisms, the combination of a series of shoes, hinge connections between said shoes, an inwardly directed hollow projection on each shoe, a U-shaped anchor link having threaded extremities, openings in said hollow projection for receiving the threaded extremities of said anchor link, nuts for releasably retaining said anchor links in position on said shoes, additional openings in said hollow projection through which said nuts are accessible, and connector links interengaged with and between anchor links of successive shoes to limit the hinge action between said shoes.

9. A truss-type tread belt for crawler mechanisms, the combination of a series of shoes, hinge connections between said shoes, an inwardly directed projection on each shoe having sockets adjacent the ends thereof, a U-shaped anchor link, the ends of said anchor link being fixed in said sockets, and connector links interengaged with and by the anchor links of successive shoes to limit the hinge action between said shoes, said projection cooperating with said anchor link to form an uninterrupted guide surface for the ends of said successive connector links.

10. In a truss-type tread belt for crawler mechanisms, the combination of a plurality of tread shoes, hinge connections therebetween, an anchor link on each shoe, and a pair of connector links engaged in the opposite ends of each anchor link, each of said connector links also being engaged in the anchor link of an adjacent shoe, to limit the hinge action between said shoes.

11. In a truss-type tread belt for crawler mechanisms, the combination of a plurality of tread shoes, hinge connections therebetween, a member centrally disposed on each shoe and forming an elongated loop, and single links between successive shoes forming connections between said loops to limit the hinge action between said shoes, the adjacent ends of successive links being slidably engaged in an intermediate loop and movable therein into and out of engagement with each other during hinge action between said shoes.

12. In a truss-type tread belt for crawler mechanisms, the combination of a plurality of tread shoes, hinge connections therebetween, a member projecting from each shoe and forming therewith an elongated loop having opposed guide surfaces extending substantially throughout the length thereof, and single connector links interengaged within the loops of successive shoes and coacting with said loops to limit the hinge action between said shoes, said links being movable lengthwise of said loops into and out of engagement with adjacent links, and the ends of said links being guided by and between said surfaces.

13. In a truss-type tread belt for crawler mechanisms the combination of a plurality of tread shoes, hinge connections therebetween, a central member on each shoe forming an inwardly projecting elongated loop, and single horizontal links interengaged with the loops of successive shoes and coacting therewith to limit the hinge action between said shoes.

14. In a truss-type tread belt for crawler mechanisms the combination of a plurality of tread shoes, hinge connections between said shoes, a pair of posts projecting inwardly from each shoe, a single link embracing the adjacent posts of successive shoes and coacting therewith to limit the hinge action between said shoes, and means for maintaining said links in proper coacting relation with said posts.

15. In a truss-type tread belt for crawler mechanisms the combination of a plurality of tread shoes, means for hingedly connecting said shoes to form a tread belt, and a chain within said belt, said chain comprising a series of interlooped links, alternate links of said series being fixed to successive shoes, the others of said links being movable lengthwise of and guided by said alternate links, all of said links being spaced inwardly from said hinge means and coacting to limit the hinge action between said shoes.

In witness whereof, I hereunto subscribe my name this 7th day of December, 1927.

GEORGE C. JETT.